(12) United States Patent
Park et al.

(10) Patent No.: US 11,803,435 B2
(45) Date of Patent: Oct. 31, 2023

(54) DEVICE AND METHOD FOR DETECTING FAILURE IN MCU

(71) Applicant: MANDO CORPORATION, Pyeongtaek-si (KR)

(72) Inventors: Jong Gyu Park, Yongin-si (KR); Chaiwon Yoon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 204 days.

(21) Appl. No.: 17/386,653

(22) Filed: Jul. 28, 2021

(65) Prior Publication Data

US 2022/0066855 A1 Mar. 3, 2022

(30) Foreign Application Priority Data

Aug. 27, 2020 (KR) .................. 10-2020-0108227

(51) Int. Cl.
*G06F 11/07* (2006.01)
*G06F 11/30* (2006.01)
*G06F 11/14* (2006.01)
*B60W 50/02* (2012.01)

(52) U.S. Cl.
CPC ........ *G06F 11/0757* (2013.01); *G06F 11/076* (2013.01); *G06F 11/0772* (2013.01); *G06F 11/1441* (2013.01); *G06F 11/3089* (2013.01); *B60W 2050/0215* (2013.01); *G06F 11/0739* (2013.01); *G06F 2201/81* (2013.01)

(58) Field of Classification Search
CPC ............. G06F 11/0736; G06F 11/0739; G06F 11/0757; G06F 11/076; G06F 11/0772; G06F 11/0793; G06F 11/0796; G06F 11/1441; G06F 11/1641; G06F 2201/81; B60W 2050/021; B60W 2050/0215; B60W 50/0225
See application file for complete search history.

(56) References Cited

U.S. PATENT DOCUMENTS

| | | | |
|---|---|---|---|
| 2009/0138137 A1* | 5/2009 | Iwagami | G06F 11/0751 701/1 |
| 2012/0065823 A1* | 3/2012 | Taguchi | B60L 3/04 701/22 |
| 2017/0291593 A1* | 10/2017 | Iwagami | F02D 41/0002 |
| 2018/0050704 A1* | 2/2018 | Tascione | B60W 10/04 |
| 2018/0203059 A1* | 7/2018 | Sacco | G01R 31/2829 |
| 2018/0322711 A1* | 11/2018 | Weimerskirch | G06N 20/00 |
| 2021/0070321 A1* | 3/2021 | Serizawa | B60W 40/02 |
| 2022/0027224 A1* | 1/2022 | Jensen | G06F 11/2028 |

* cited by examiner

*Primary Examiner* — Bryce P Bonzo
*Assistant Examiner* — Albert Li
(74) *Attorney, Agent, or Firm* — Morgan, Lewis & Bockius LLP (57) ABSTRACT

The disclosure relates to an MCU failure detection device and method. According to the disclosure, a device for detecting a failure in a microcontroller unit (MCU) comprises a receiver receiving first watchdog output information for determining a failure from an electronic control device, a determination unit determining whether the electronic control device has a failure based on the first watchdog output information, and upon determining that the electronic control device has the failure, transmitting a first reset signal to the electronic control device.

10 Claims, 8 Drawing Sheets

DEVICE AND METHOD FOR DETECTING FAILURE IN MCU

CROSS-REFERENCE TO RELATED APPLICATION

This application claims priority from Korean Patent Application No. 10-2020-0108227, filed on Aug. 27, 2020, which is hereby incorporated by reference for all purposes as if fully set forth herein.

BACKGROUND

Field

The disclosure relates to a device and method for detecting a failure in an MCU and, more specifically, to a device and method for detecting a failure in an electronic control device.

Description of Related Art

An embedded system typically includes a microcontroller unit (MCU) for performing control and a watchdog timer (WDT) for monitoring the operation of the MCU. The watchdog timer is an electronic timer used to detect and recover malfunctions in a computer or embedded system. While operating normally, the system resets the watchdog timer according to a preset cycle to prevent a timeout due to an increase in the error count of the watchdog timer. In other words, when the system operates abnormally due to an unintended error, the watchdog timer is not reset but reaches a preset count and causes a timeout. In this case, the watchdog timer may determine that a malfunction has occurred in the system and may stop or reset the system.

Meanwhile, as user convenience devices, such as for autonomous driving, increase, automotive safety integrity level (ASIL)-related activities sharply increase in significance, as for safely driving the user convenience devices. Sensors, such as Light Detection and Ranging (LiDAR), radar, cameras, and ultrasonic sensors, play a key role in providing driver-friendly functions as well as user-friendly functions. The operation of the MCU, which drives the system and processes computation, is an important part in safety design. A plenty of systems adopt a watchdog function to prevent the internal operation of the MCU from being stuck due to, e.g., computational errors, so as to give better reliability for the internal operation of the MCU.

BRIEF SUMMARY

According to the disclosure, there is provided an MCU failure detection device and method that detects a failure in an electronic control device and resets the electronic control device.

According to an embodiment of the disclosure, there is provided a device for detecting a failure in a microcontroller unit (MCU), comprising a receiver receiving first watchdog output information for determining a failure from an electronic control device, a determination unit determining whether the electronic control device has a failure based on the first watchdog output information, and a transmitter, upon determining that the electronic control device has the failure, transmitting a first reset signal to the electronic control device.

According to an embodiment of the disclosure, there is provided a method for detecting a failure in an MCU, comprising receiving first watchdog output information from an electronic control device, determining whether the electronic control device has a failure based on the first watchdog output information, and upon determining that the electronic control device has the failure, transmitting a first reset signal to the electronic control device.

According to the disclosure, the MCU failure detection device and method may directly detect a failure in an electronic control device based on watchdog output information and reset the electronic control device, thereby reinforcing stability.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

An MCU failure detection device 10 is described below with reference to the accompanying drawings, according to an embodiment of the disclosure.

Figure 1:
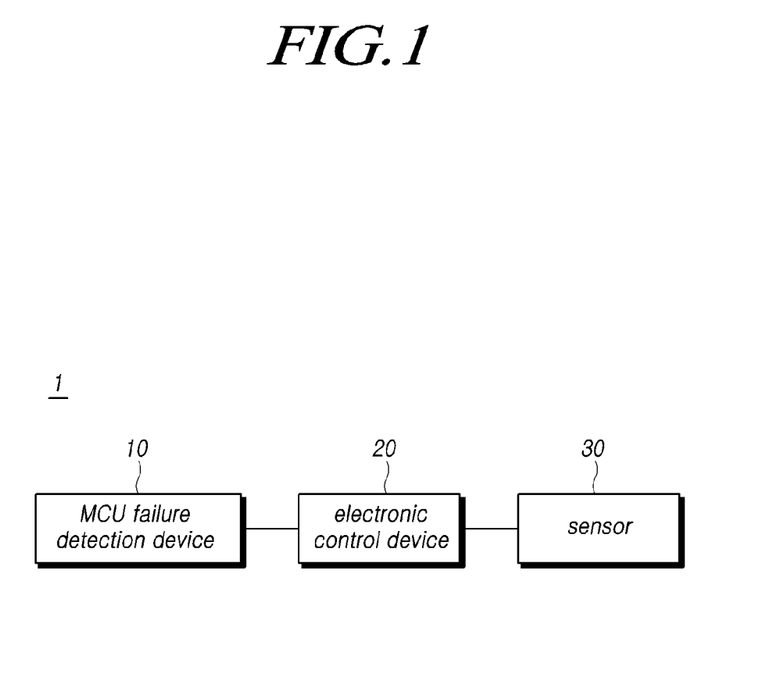
FIG. 1 is a view schematically illustrating an MCU failure detection system according to an embodiment.

FIG. 1 is a view schematically illustrating an MCU failure detection system 1 according to an embodiment.

Referring to FIG. 1, according to an embodiment, the MCU failure detection system 1 may include an MCU failure detection device 10, an electronic control device 20, and a sensor 30.

The MCU failure detection system 1 may determine whether the electronic control device 20 operates abnormally based on watchdog output information generated by the electronic control device 20 and, if the electronic control device 20 abnormally operates as a result of the determination, the MCU failure detection system 1 may transmit a first reset signal to the electronic control device 20.

Specifically, the sensor 30 is a component that detects, classifies, and measures physical quantities, such as of heat, light, temperature, pressure, and sound, or changes therein and indicates them by way of a predetermined signal. The sensor 30 is not limited to a specific sensor, such as a radar sensor, vehicle speed sensor, torque sensor, steering angle sensor, rack position sensor, location sensor, or image sensor.

The sensor 30 may generate sensing information by detecting the movement, sound, pressure, or heat of a specific object. Further, the sensor 30 may determine whether the sensor 30 itself has an error by determining the integrity of the generated sensing information. A processor included in the sensor 30 may determine whether there is an error in the sensor 30 based on the sensing information. The sensor 30 may transmit, to the electronic control device 20, sensor state information including the result of determination of an error in the sensor 30, along with the sensing information. The sensing information may be data in the form of an image or data in the form of a radar signal received through an antenna, depending on the type of the sensor 30.

The sensor 30 may detect whether there the sensor 30 itself has an error through the sensing information. Information for the state of the sensor obtained through the result of detection may be defined as sensor state information. To detect a failure in the sensor 30 itself, the sensor 30 may include a processor, and the processor may include at least one core. If the processor includes a plurality of cores, at least one lockstep core may be among the plurality of cores. As an example, the processor may be a microcontroller unit (MCU).

The electronic control device 20 may periodically transmit first watchdog output information to the MCU failure detection device 10. The first watchdog output information may include a heartbeat of the electronic control device 20, information for abnormalities in the sensor 30, and a signal for requesting to reset the electronic control device 20. The heartbeat may be transmitted to the MCU failure detection device 10 every predetermined period and, if the MCU failure detection device 10 fails to receive a heartbeat for a predetermined period of time, the MCU failure detection device 10 may determine that the electronic control device 20 has a failure. The MCU failure detection device 10 may basically determine whether to transmit a reset signal to the electronic control device 20 based on the heartbeat.

The electronic control device 20 may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

The electronic control device 20 of the disclosure may be implemented as a microcontroller unit (MCU) included in the above-described ECU. The electronic control device 20 implemented as an MCU may have the same configuration and function as the above-described ECU.

The MCU failure detection device 10 may be included in the electronic control device 20, or may be independently located outside the electronic control device 20. Hereinafter, it is assumed that the MCU failure detection device 10 is located outside the electronic control device 20. However, embodiments of the disclosure are not limited thereto.

The MCU failure detection device 10 may receive the first watchdog output information from the electronic control device 20, and determine whether the electronic control device 20 has a failure based on the first watchdog output information. If it is determined that the electronic control device 20 has a failure, the MCU failure detection device 10 may transmit a first reset signal for initializing the electronic control device 20 to the electronic control device 20.

The MCU failure detection device 10 is described below in detail with reference to FIG. 2.

Figure 2:
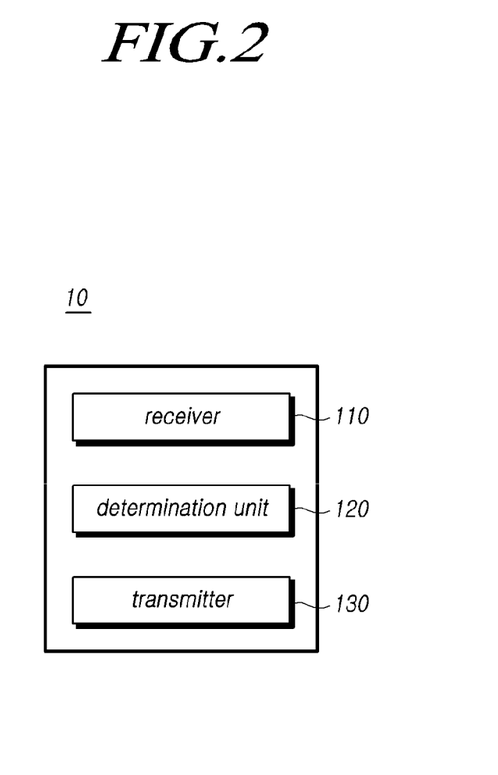
FIG. 2 is a block diagram illustrating an MCU failure detection device according to an embodiment.

FIG. 2 is a block diagram illustrating an MCU failure detection device 10 according to an embodiment.

Referring to FIG. 2, according to an embodiment, an MCU failure detection device 10 may include a receiver 110, a determination unit 120, and a transmitter 130.

The receiver 110 may receive first watchdog output information from the electronic control device 20.

Figure 3:
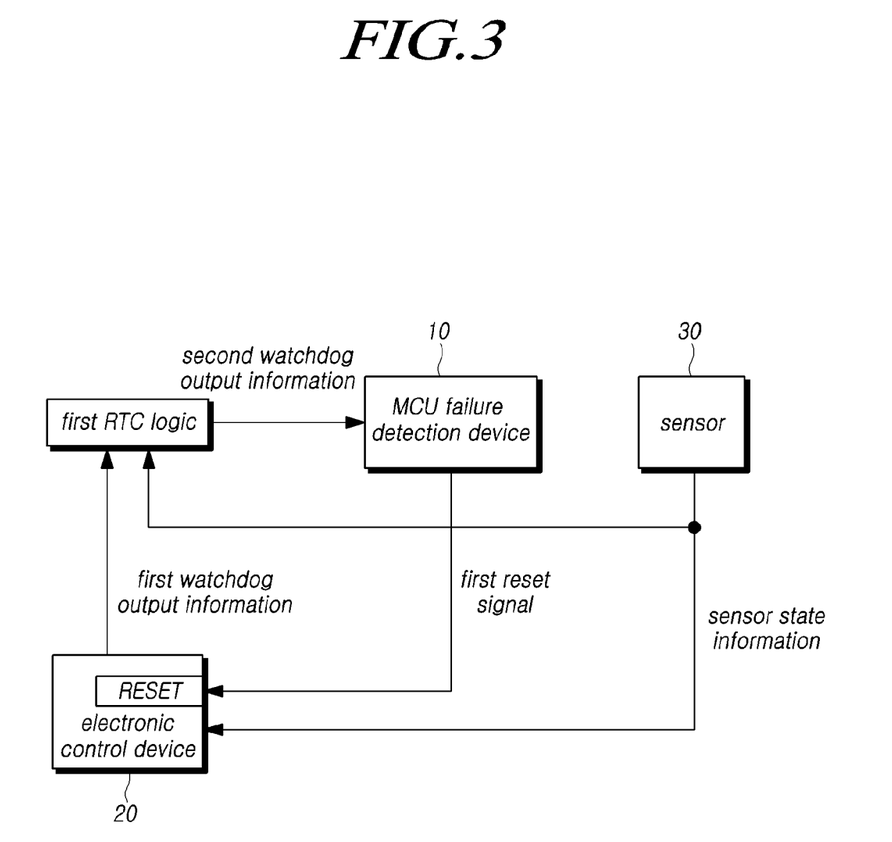
FIG. 3 is a view illustrating an example of receiving first watchdog output information by a receiver according to an embodiment.

FIG. 3 is a view illustrating an example of receiving first watchdog output information by a receiver 110 according to an embodiment.

Referring to FIG. 3, according to an embodiment, second watchdog output information may be a signal obtained by merging, by a first register transfer level (RTL) logic, the first watchdog output information output from the electronic control device 20 and sensor state information received from the sensor 30. Specifically, the sensor 30 may transmit the sensor state information to the electronic control device 20 and may additionally transmit the sensor state information to the MCU failure detection device 10. The electronic control device 20 may transmit the first watchdog output information to the MCU failure detection device 10. Before received by the receiver 110 of the MCU failure detection device 10, the first watchdog output information and the sensor state information may be merged into the second watchdog output information by the first RTL logic. The period of transmission of a reset signal may be adjusted by the first RTL logic which is previously set. For example, the first RTL logic may count errors included in the sensor state information and errors included in the first watchdog output information and, if the count is a predetermined number or more, produce second watchdog output information including failure information. As another example, the first RTL logic counts occasions where both the first watchdog output information and the sensor state information received from the sensor 30 indicate that the sensor 30 has a failure and, if the count is a predetermined number or more, produce second watchdog output information including failure information. The failure information may be information indicating that the sensor is determined, on its own, to be in an abnormal state due to an error therein. The determination unit 120 may determine that the electronic control device 20 has a failure based on the second watchdog output information and generate a first reset signal.

As described above, the MCU failure detection device 10 may more precisely perform failure detection on the electronic control device by receiving the second watchdog output information.

Referring back to FIG. 2, the determination unit 120 may determine whether the electronic control device 20 has a failure based on the first watchdog output information. The determination unit 120 may determine whether the electronic control device 20 has a failure based on state information for the electronic control device 20 included in the first watchdog output information. For example, the determination unit 120 may determine that the electronic control device 20 has a failure based on the first watchdog output information including a signal for requesting to reset the electronic control device 20, and the determination unit 120 may determine whether the electronic control device 20 has a failure based on the first watchdog output information including information as to whether the electronic control device 20 and the sensor 30 have a failure. Unless the heartbeat signal included in the watchdog output information is not received or the strength thereof is changed, the determination unit 120 may determine that the electronic control device 20 has a failure.

In transmitting the first reset signal to the electronic control device 20, the MCU failure detection device 10 may function as a watchdog timer and, to reset the count of the watchdog timer, the watchdog output information may include a count reset signal of the watchdog timer. If the watchdog output information lacks the count reset signal of detection target, the determination unit 120 may determine that the electronic control device 20 has a failure and generate the first reset signal.

The determination unit 120 may determine whether the sensor 30 has a failure based on the sensor state information included in the sensing information. If at least one of the electronic control device 20 or the sensor 30 has a failure, the determination unit 120 may generate the first reset signal.

The MCU failure detection device 10 may include a processor including at least one core for the above-described failure detection. As an example, the processor may be an MCU.

As described above, the MCU failure detection device 10 may detect a failure in the electronic control device 20 through watchdog output information.

If the electronic control device 20 has a failure, the transmitter 130 may transmit the first reset signal to the electronic control device 20.

The receiver 110 and the transmitter 130 may share a port or a communication module to transmit/receive data such as the first reset signal, the first watchdog output information, the second watchdog output information, and the sensor state information. For example, the receiver 110 and the transmitter 130 may include at least one of a watchdog input (WDI) 11, a general purpose input output (GPIO)/INT 12, a serial peripheral interface (SPI)/inter integrated circuit (I2C) 13, or a low voltage differential signaling (LVDS).

Figure 4:
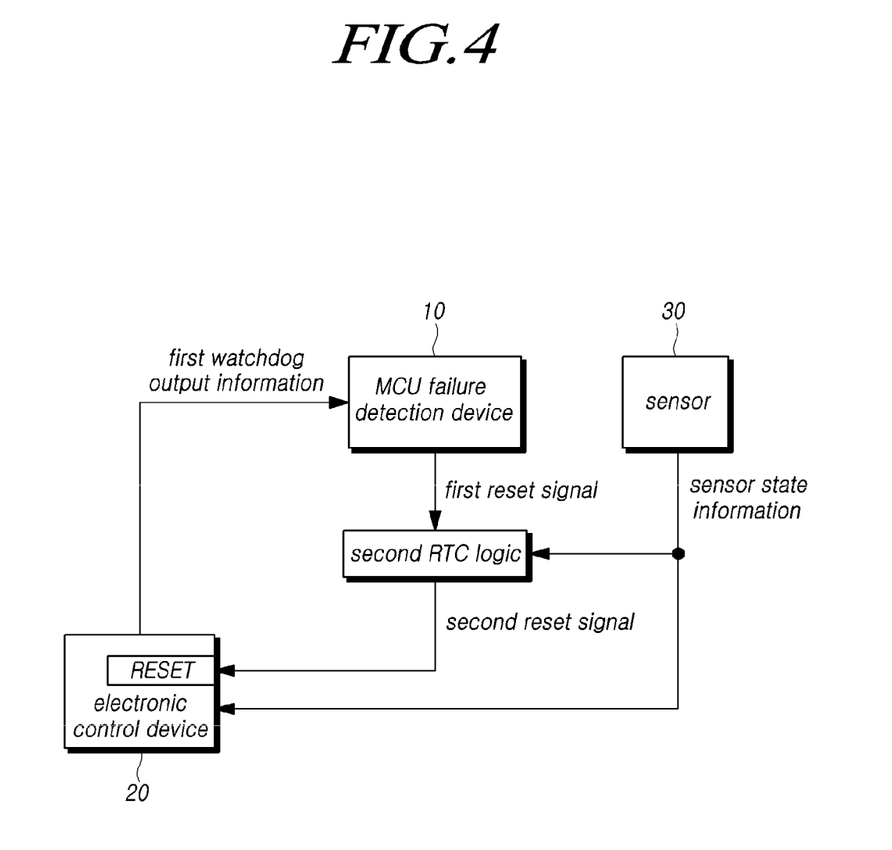
FIG. 4 is a view illustrating an example of transmitting a second reset signal to an electronic control device according to an embodiment.

FIG. 4 is a view illustrating an example of transmitting a second reset signal to an electronic control device 20 according to an embodiment.

Referring to FIG. 4, the first reset signal may be merged with the sensor state information from the sensor 30, into a second reset signal, by a second RTL logic. Specifically, the second RTL logic may count occasions where the sensor state information has failure information and the first reset signal is received and, if the count is a predetermined number or more, produce a second reset signal. The first watchdog output information is received by the receiver 110 in a very short period, and the sensor 30 or the electronic control device 20 by itself may address an error, or an error may occur in the process flow and data flow for the MCU failure detection method. Thus, it may be too early to determine a failure by generating a first reset signal based on a single abnormal operation. Thus, the MCU failure detection device 10 may more accurately detect an abnormal operation from accumulated first reset signals transmitted and determined based on the watchdog output information received every period due to continuous errors, rather than responding to a mere one-time error by transmitting a second reset signal.

As described above, the MCU failure detection device 10 may more precisely detect an abnormal operation of the electronic control device 20 using the second RTL logic.

Figure 5:
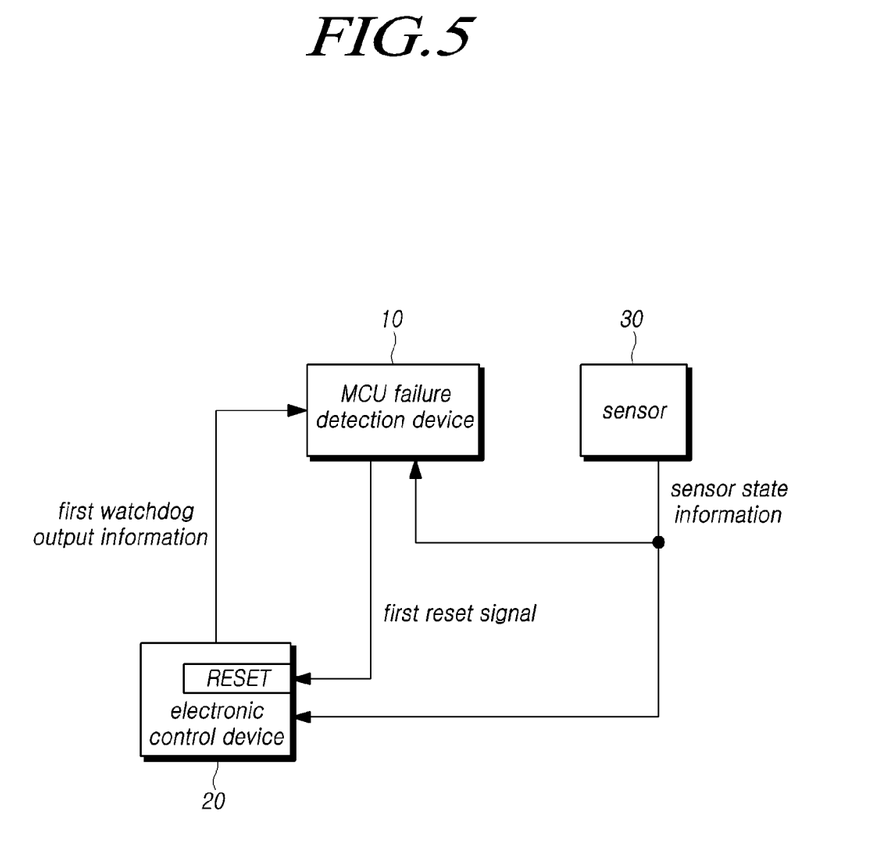
FIGS. 5 and 6 are views illustrating an example of determining a failure in an electronic control device based on watchdog output information and sensor state information according to an embodiment.
Figure 6:
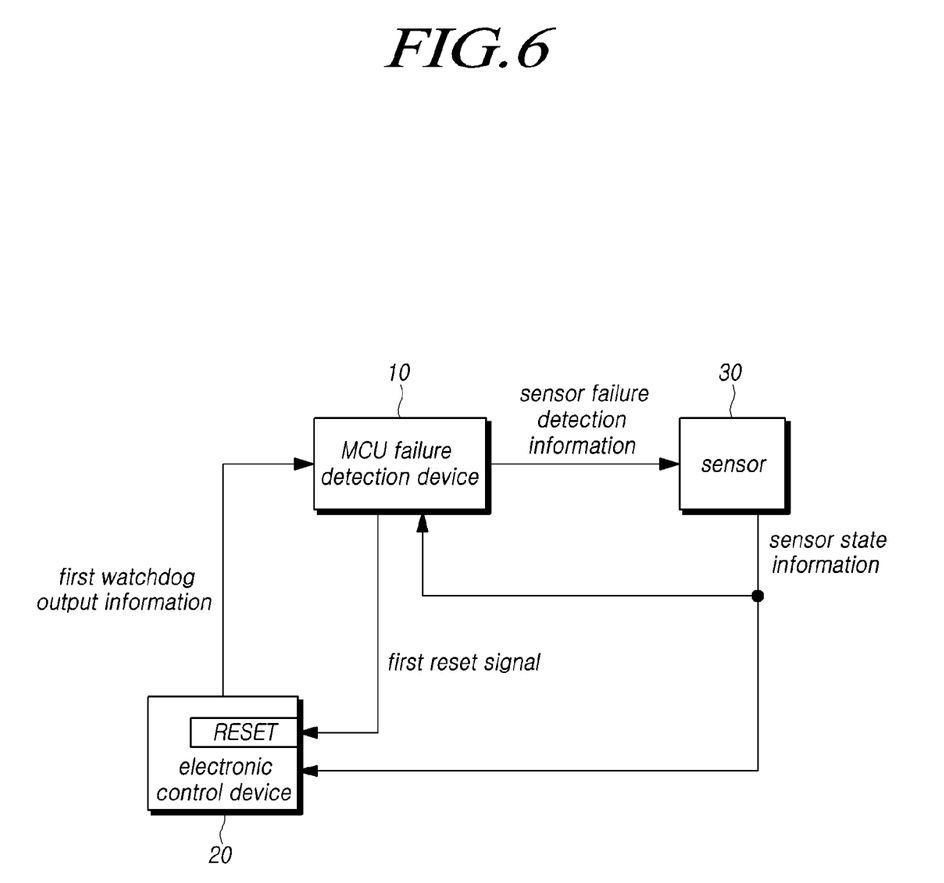

FIGS. 5 and 6 are views illustrating an example of determining a failure in an electronic control device 20 based on watchdog output information and sensor state information according to an embodiment.

Referring to FIG. 5, the receiver 110 may further receive sensor state information from the sensor 30, and the determination unit 120 may determine whether the electronic control device 20 has a failure based on the first watchdog output information and the sensor state information. In other words, as the receiver 110 receives the sensor state information from both the electronic control device 20 and the sensor 30, the determination unit 120 may more accurately determine whether the electronic control device 20 has a failure. The determination unit 120 may determine whether the electronic control device 20 abnormally operates by comparing the sensor state information received from the electronic control device 20 with the sensor state information received from the sensor 30.

Referring to FIG. 6, the determination unit 120 may determine whether the sensor 30 has a failure based on the sensor state information, and the transmitter 130 may transmit failure detection information for the sensor 30 to the sensor 30. For example, the sensor 30 may receive feedback on the sensor state information by reading failure detection information for the sensor 30 stored in the MCU failure detection device 10.

Figure 7:
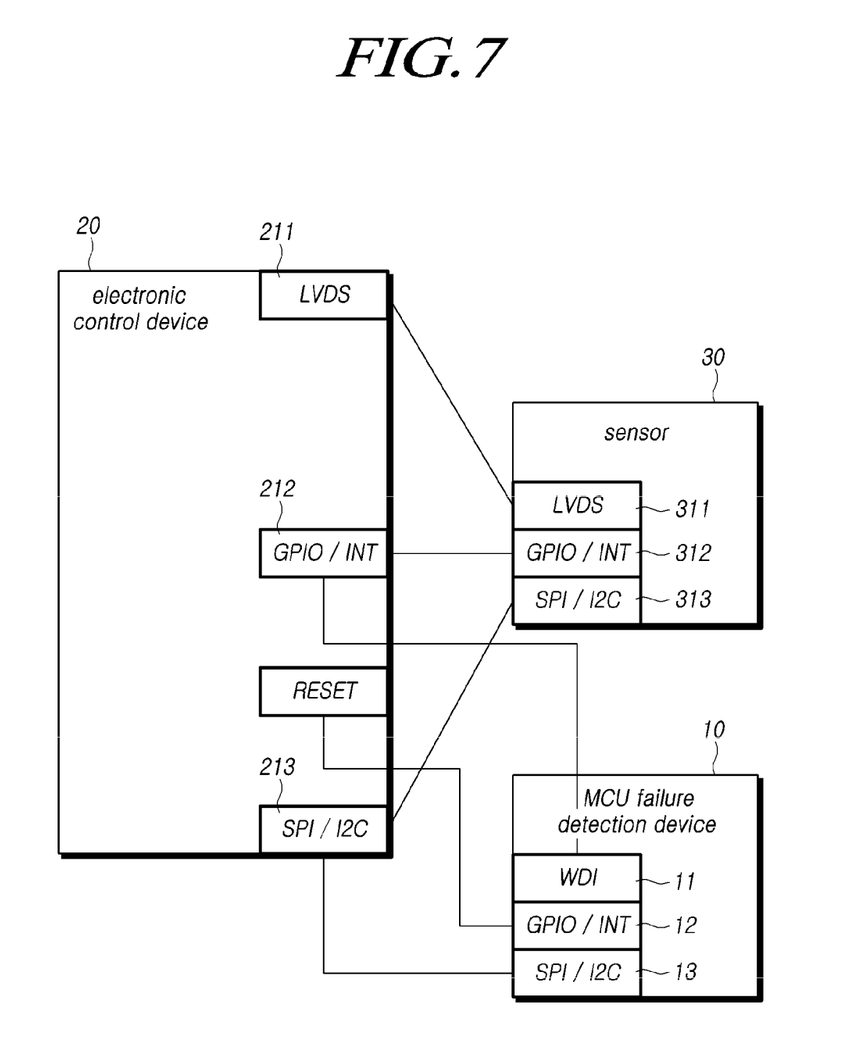
FIG. 7 is a view illustrating a connection relationship for an MCU failure detection system according to an embodiment.

FIG. 7 is a view illustrating a connection relationship for an MCU failure detection system 1 according to an embodiment.

Referring to FIG. 7, the MCU failure detection device 10, the electronic control device 20, and the sensor 30 included in the MCU failure detection system 1 may use the same communication scheme. For example, if the sensor 30 transmits sensing data to the electronic control device 20 through the LVDS 311, the electronic control device 20 may also receive the sensing data through the LVDS 211 and, if the sensor 30 transmits sensor state information to the electronic control device 20 through the GPIO/INT 312, the electronic control device 20 may receive the sensor state information through the GPIO/INT 212. If the MCU failure detection device 10 receives the sensor state information from the sensor 30, the MCU failure detection device 10 may receive the sensor state information through the GPIO/INT 312 of the sensor 30 and the GPIO/INT 12 of the MCU failure detection device 10.

As such, the LVDS 311 of the sensor 30 may be connected with the LVDS 211 of the electronic control device 20. The GPIO/INT 312 of the sensor 30 may be connected with the GPIO/INT 212 of the electronic control device 20. The SPI/I2C 313 of the sensor 30 may be connected with the SPI/I2C 213 of the electronic control device 20. The sensor 30 may transmit the sensor state information to the MCU failure detection device 10 through the GPIO/INT, and the MCU failure detection device 10 may receive the sensor state information through the GPIO/INT. The result of failure detection determined by the MCU failure detection device 10 based on the sensor state information may be transmitted from the MCU failure detection device 10 to the sensor 30 through the SPI/I2C 13 of the MCU failure detection device 10, and may be received by the sensor 30 through the SPI/I2C 313 of the sensor 30.

The first watchdog output information may be transmitted from the electronic control device 20 through the GPIO/INT 212 and received by the MCU failure detection device 10 through the watchdog input (WDI) 11. The MCU failure detection device 10 may transmit the first reset signal to the electronic control device 20 through the GPIO/INT 12, and the electronic control device 20 may receive the first reset signal through the GPIO/INT 212. The first reset signal may control the MCU failure detection device to be reset. The WDI 11 may be an input terminal of the GPIO/INT 12 of the MCU failure detection device 10 and may be replaced with the GPIO/INT 12. Additionally, the MCU failure detection device 10 may transmit configuration information for the MCU failure detection device 10 through the SPI/I2C 13, and the electronic control device 20 may receive the configuration information through the SPI/I2C 213.

Described below is an MCU failure detection method using the MCU failure detection device 10 capable of performing all of the above-described operations or functions.

Figure 8:
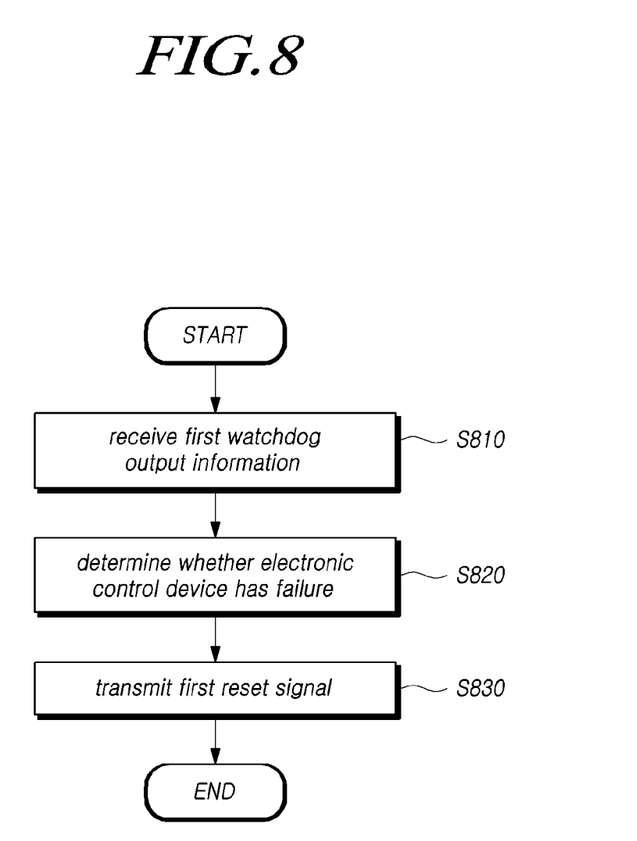
FIG. 8 is a flowchart illustrating an MCU failure detection method according to an embodiment.

FIG. 8 is a flowchart illustrating an MCU failure detection method according to an embodiment.

Referring to FIG. 8, according to an embodiment, a method for detecting a failure in an MCU may comprise receiving first watchdog output information from an electronic control device 20 (S810), determining whether the electronic control device 20 has a failure based on the first watchdog output information (S820), and upon determining that the electronic control device 20 has the failure, transmitting a first reset signal to the electronic control device 20 (S830).

Receiving the first watchdog output information (S810) may further receive sensor state information from a sensor 30.

Determining whether the electronic control device has the failure (S820) may determine whether the electronic control device 20 has the failure based on the first watchdog output information and the sensor state information.

Determining whether the electronic control device has the failure may determine whether the sensor 30 has a failure based on the sensor state information.

Transmitting the first reset signal (S830) may transmit a result of determination of the failure in the sensor to the sensor 30.

The sensor state information may be a result of determination of whether the sensor 30 has the failure, by a processor included in the sensor 30.

The first watchdog output information may include a result of determining whether to reset the electronic control device 20 based on sensing information received from the electronic control device 20.

Receiving the first watchdog output information (S810) may further receive second watchdog output information. The second watchdog output information may be obtained by merging sensor state information from the sensor and the first watchdog output information by a first RTL logic. The first RTL logic may count occasions where either the sensor state information or the first watchdog output information includes failure information and, if the count is a predetermined number or more, produce the second watchdog output information.

The first reset signal and the sensor state information from the sensor 30 may be merged into a second reset signal by a second RTL logic. The second RTL logic may count occasions where the sensor state information has failure information and the first reset signal is received and, if the count is a predetermined number or more, produce a second reset signal.

As described above, according to the disclosure, the failure detection device and method may add the logical computation functionality of the MCU to the basic watchdog (WD), thereby allowing for a more reliable RESET range for adjustment and preventing a wrong reset.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A device for detecting a failure in a microcontroller unit (MCU), the device comprising:
a receiver receiving first watchdog output information from an electronic control device for determining whether the electronic control device has a failure;
a determination unit determining whether the electronic control device has the failure based on the first watchdog output information; and
a transmitter, upon determining that the electronic control device has the failure, transmitting a first reset signal to the electronic control device,
wherein the receiver further receives sensor state information from a sensor,
wherein the receiver further receives second watchdog output information, and wherein the second watchdog output information is obtained by merging sensor state information from the sensor and the first watchdog output information by a first register transfer level (RTL) logic,
wherein the first RTL logic counts occasions where either the sensor state information or the first watchdog output information includes failure information and, if the count is a predetermined number or more, produces the second watchdog output information.

2. The device of claim 1,
wherein the determination unit determines whether the electronic control device has the failure based on the first watchdog output information and the sensor state information.

3. The device of claim 2, wherein the determination unit determines whether the sensor has a failure based on the sensor state information, and
wherein the transmitter transmits a result of determination of the failure in the sensor to the sensor.

4. The device of claim 1, wherein the sensor state information is a result of determination of whether the sensor has a failure, by a processor included in the sensor.

5. The device of claim 1, wherein the first watchdog output information includes a result of determining whether to reset the electronic control device based on sensing information received from the electronic control device.

6. A method for detecting a failure in an MCU, the method comprising:
receiving first watchdog output information from an electronic control device; determining whether the electronic control device has a failure based on the first watchdog output information; and
upon determining that the electronic control device has the failure, transmitting a first reset signal to the electronic control device,
wherein receiving the first watchdog output information further includes receiving sensor state information from a sensor,
wherein the first reset signal and the sensor state information from the sensor are merged into a second reset signal by an RTL logic,
wherein the RTL logic counts occasions where the sensor state information includes failure information and the first reset signal is received and, if the count is a predetermined number or more, produces the second reset signal.

7. The method of claim 6, wherein
determining whether the electronic control device has the failure includes determining whether the electronic control device has the failure based on the first watchdog output information and the sensor state information.

8. The method of claim 7, wherein determining whether the electronic control device has the failure includes determining whether the sensor has a failure based on the sensor state information, and wherein transmitting the first reset signal includes transmitting a result of determination of the failure in the sensor to the sensor.

9. The method of claim 6, wherein the sensor state information is a result of determination of whether the sensor has a failure, by a processor included in the sensor.

10. The method of claim 6, wherein the first watchdog output information includes a result of determining whether to reset the electronic control device based on sensing information received from the electronic control device.

* * * * *